March 27, 1962 S. L. STILLMAN, JR 3,027,539
HYDRODYNAMICALLY BALANCED TOWING APPARATUS FOR
MAINTAINING HYDROPHONES VERTICALLY ORIENTATED
Filed May 14, 1959
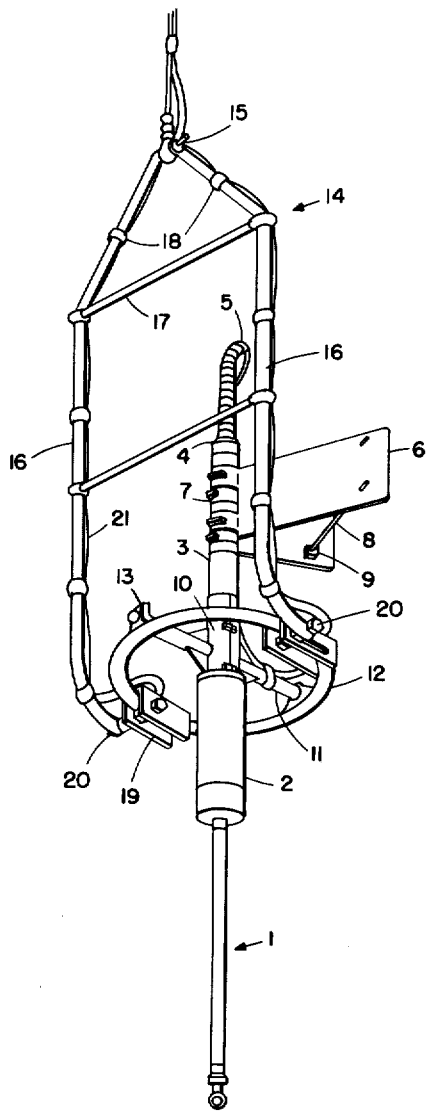
Stephen L. Stillman, Jr.
*INVENTOR.*
BY
*d l-Shrogo.*

United States Patent Office 3,027,539
Patented Mar. 27, 1962

3,027,539
HYDRODYNAMICALLY BALANCED TOWING APPARATUS FOR MAINTAINING HYDROPHONES VERTICALLY ORIENTATED
Stephen L. Stillman, Jr., North Falmouth, Mass., assignor to the United States of America as represented by the Secretary of the Navy
Filed May 14, 1959, Ser. No. 813,321
5 Claims. (Cl. 340—5)

The present invention relates generally to underwater hydrophones for detecting and for measuring sound pressure waves and more particularly to apparatus for controlling the attitude of a hydrophone moving through a fluid medium so as to stabilize it in a position corresponding to maximum signal sensitivity in desired directions.

In some underwater sound detecting and measuring systems, the hydrophone employed takes the form of a cylindrical array of either piezoelectric crystals or magnetostrictive elements, since this configuration is one way for achieving a shaded-upward directional signal response characteristic. A hydrophone shaded upward is one that is not sensitive to sound from, say, below the horizontal in any direction. If the hydrophone assembly is not symmetrically designed from a hydrodynamic standpoint, its movement through the water will produce vibrations and other disturbances which will seriously affect the sound quality at its pressure-sensitive pickup elements. Furthermore, as is well known, the drag forces acting on the hydrophone assembly tend to displace it into a horizontal plane. As sound detection directionality is of principal interest in the orientation of this line hydrophone, this misalignment would cause the shaded area to be above the horizontal.

Prior art systems have attempted to counteract the unbalancing effect of the drag forces by securing buoyant members and stabilizing weights above and below the hydrophone. However, since the tow point is usually above the hydrophone, these weights tend to move towards the towing level and, consequently, their depressing effect is limited to relatively low speeds. Although this range can be extended to some extent by increasing the size of these weights, the advantage so gained is more than offset by the difficulty in handling the complete apparatus.

It is accordingly a primary object of the present invention to provide apparatus for maintaining a hydrophone in a vertically stabilized position as it is towed through a fluid medium, which position results in maximum signal directionality.

Another object of the present invention is to provide apparatus which will maintain a directional hydrophone in a stabilized vertical position at speeds up to approximately eight knots.

Another object of the present invention is to provide an aligner for a towed hydrophone which will neutralize the drag forces tending to displace the transducer from its proper orientation.

A still further object of the present invention is to provide a towing rig for a directional hydrophone which will prevent undersea current from disturbing its alignment.

A still further object of the present invention is to provide a simple, rugged, lightweight, hydrodynamically balanced towing rig for a directional hydrophone.

Other objects and many of the attendant advantages of this invention will be readily appreciated as the same becomes better understood by reference to the following detailed description when considered in connection with the accompanying drawing, the single figure of which is a perspective view of a preferred embodiment of the invention.

Referring now to the drawing, a conventional line-type hydrophone, generally represented by reference character 1 and taking the form of, for example, a cylindrical array of stacked piezoelectric crystals, is surmounted by a casing 2 which may contain preamplifying circuits, and the like, for locally increasing the amplitude of the electrical signals developed by the transducer in the case where the latter is performing as a sound pressure pickup device. Casing 2, in turn, is secured at its top to a watertight sleeve 3 which houses the output conductors before they emerge at junction 4 as cable 5. Secured near the top of this sleeve is a pair of vanes 6 whose azimuthal orientation and vertical position on this sleeve is adjustable by means of circular clamps 7 welded or otherwise connected thereto. The angular separation of these vanes can also be altered by means of a pair of rods 8, which coact with nuts 9, secured to the inner surface of each of the vanes.

The complete transducer assembly, consisting of the signal pickup portion 1, the preamplifying section 2 and the sleeve 3, is suspended from a towing frame 14 by a gimbal arrangement. Thus, this assembly is free to rotate about two horizontal axes, both of which are also perpendicular to the longitudinal axis of the transducer. To realize the first of these two degrees of rotation, the lower portion of casing 3 has secured thereto a split circular collar 10 which has a pair of tubular members 11 projecting therefrom in diametrically opposite directions. A tubular ring 12 is adapted to rotate about the longitudinal axis of these aligned tubes. This is accomplished by affixing a pair of upstanding bosses 13 to diametrically opposite portions of the ring and having a pair of drift pins pass through appropriate holes in these bosses into the tubular members, each end of which accommodates a suitable bearing. The second degree of rotation is realized simply by pivotally mounting ring member 12 to towing frame 14 at two points 20 which are each spaced 90° from the above bosses. This pivoting action may be achieved by any well known technique. Towing frame 14 comprises a pair of parallel, tubular lengths 18, stiffeners 16 and converging lengths 17, and the towing connection is made at the point where the latter members meet. It will be seen that since ring 12 is capable of rotating about the axis passing through points 20 and also about the longitudinal axis of tubular sections 11, the necessary gimbal movement is possible.

In order to insure that the transducer assembly is maintained in a stabilized attitude, there is a provision, namely the adjustable vanes, for balancing the drag forces acting above and below the plane of rotation approximately defined by the above two axes. For purposes of discussion, it will be assumed that the drag acting on that portion of the transducer which is below this plane is greater than that acting above so that there is a tendency for the hydrophone to rotate counterclockwise about axis 20. To counteract this tendency, it is, therefore, necessary to introduce an additional drag to that portion of the hydrophone which is above the latter axis. This function is performed by vanes 16. It will be appreciated that the amount of drag contributed by this element can be varied by simply altering the angle between the vanes and/or their horizontal position with respect to the plane of rotation. When the hydrodynamic drag is thus equalized, the system will be rotatably stable. However, since this stabilization may not result in the vertical alignment of the hydrophone, there is a provision in the system for varying the vertical location of split collar 10 on sleeve 3. Due to the presence of the relatively long and heavy signal pickup portion 1 and preamplifying section 2, the center of gravity of the transducer assembly can be considered as being located well below the plane of rotation, somewhere, perhaps, along the pickup portion itself. Because of this, there is a restoring moment acting in the system which functions to maintain the complete assembly in a vertical attitude. As is well known, this restoring moment is equal to the product of the mass of the hydrophone assembly, acting as its center of gravity, times the distance between the center of gravity and the effective point of rotation. Thus, by modifying the vertical location of collar 10, the size of this restoring force can be changed to fit the particular towing conditions required.

It will be appreciated that in the above description the additional drag had to be added to the top portion of the hydrophone because of the assumed conditions. However, the exact location and orientation of the vanes will be determined by the particular hydrodynamic characteristics of the hydrophone. Hence, the vanes may be located below the plane of rotation and their azimuthal orientation also changed from that shown in the figure, where, for example, the vanes have to balance a rotary motion that could otherwise develop about the axis of towing direction.

A further measure of balance is realized, according to the present invention, by securing a length of dummy electrical cable 21 to the towing frame so as to counteract the drag of the output cable 5.

It would also be pointed out that the tubing of the towing frame 14 is pierced with a multiplicity of holes at convenient points so as to allow free-flooding of the apparatus. This mode of operation is desirable since it tends to make the tubes transparent to sound and also prevents their collapse due to great water pressure encountered far below the surface.

While the main function of the vanes, as mentioned hereinbefore, is to equalize the hydrodynamic drag acting on the transducer assembly, their V-shape also acts to align the apparatus in the direction of any undersea currents, thereby further improving the stability of the complete apparatus.

Obviously many modifications and variations of the present invention are possible in the light of the above teachings. It is therefore to be understood that within the scope of the appended claims the invention may be practiced otherwise than as specifically described.

What is claimed is:

1. In an arrangement for maintaining an underwater hydrophone assembly in a substantially vertical position as it is being towed through a fluid medium, the combination of a cylindrical hydrophone assembly, a towing frame, said towing frame supporting said hydrophone assembly at a point intermediate its length such that said assembly is free to pivot about two mutually horizontal axes, both of which are also perpendicular to the longitudinal axis of said hydrophone assembly, said intermediate point being selected such that it is above the center of gravity of said hydrophone assembly whereby the mass of said hydrophone assembly acts as a restoring moment to maintain said hydrophone assembly in a substantially vertical attitude, a V-shaped member secured to that portion of the hydrophone assembly that is above said intermediate point, means for varying the magnitude of the apex angle of said V-shaped member thereby to increase the drag force acting on that portion of said hydrophone assembly which is above said intermediate point.

2. In an arrangement for maintaining an underwater hydrophone assembly in a vertical attitude as it is being towed through a fluid medium, a hydrophone assembly, said hydrophone assembly including a cylindrical signal pickup section and a concentric tubular housing surmounting said section, a towing frame, means for suspending said hydrophone assembly from said towing frame at a point intermediate the length of said tubular housing whereby said assembly is free to pivot about two mutually perpendicular horizontal axes, said intermediate point being located above the center of gravity of said assembly and at a location such that the hydrodynamic drag action upon that portion of said assembly which is above said intermediate point is less than that below said point, a V-shaped member secured at its apex to said tubular housing, the vertical location of said V-shaped member and its included angle being changeable whereby the drag forces acting above and below said intermediate point can be equalized and said assembly stabilized against angular rotation, said assembly being further stabilized in a vertical attitude as a result of the restoring moment of the mass of said assembly acting at its center of gravity.

3. In an arrangement for maintaining an underwater hydrophone assembly in a vertical position as it is being towed through a fluid medium, a cylindrical hydrophone assembly, said hydrophone assembly including a signal pickup portion surmounted by a concentric, tubular housing, a towing frame, a gimbal arrangement interconnecting said towing frame and said tubular housing whereby said assembly can pivot about two mutually perpendicular, horizontal axes, said gimbal arrangement being secured to said housing at a point above the center of gravity of said assembly, means for equalizing the hydrodynamic drag acting upon those portions of the assembly which are above and below said point, whereby said assembly is stabilized against rotation, said assembly being further stabilized in a vertical attitude because of the restoring moment of the mass of said assembly acting at said center of gravity.

4. In an arrangement as defined in claim 3 where said means for equalizing the hydrodynamic drag comprises a V-shaped member secured at its apex to said assembly at that portion thereof which otherwise has the smaller hydrodynamic drag force.

5. In an arrangement for stabilizing the attitude of a hydrophone assembly as it moves through a fluid medium, the combination of a cylindrical hydrophone assembly, a towing frame, a gimbal arrangement interconnecting said hydrophone assembly and said frame at a point intermediate the length of said hydrophone assembly whereby said hydrophone assembly is free to pivot about two mutually perpendicular horizontal axes, said intermediate point being located such that it is above the center of gravity of said hydrophone assembly whereby the mass of said hydrophone assembly acts as a restoring force to stabilize said hydrophone assembly in a vertical attitude and means for varying the hydrodynamic drag acting upon that portion of the hydrophone assembly that is above said point, said last-mentioned means including a pair of V-shaped plates secured at their apex to said hydrophone assembly, the angular separation and orientation of said plates being adjustable.

References Cited in the file of this patent

UNITED STATES PATENTS

| | | |
|---|---|---|
| 2,019,497 | Kuntze | Nov. 5, 1935 |
| 2,544,819 | Babb et al. | Mar. 13, 1951 |
| 2,590,531 | McLoad | Mar. 25, 1952 |
| 2,826,749 | Ellenberger | Mar. 11, 1958 |